United States Patent
Kai et al.

(10) Patent No.: US 11,236,205 B2
(45) Date of Patent: Feb. 1, 2022

(54) PROCESS FOR THE PREPARATION OF RESIN-INORGANIC FIBERS COMPOSITE AND THE OBTAINED RESIN-INORGANIC FIBERS COMPOSITE FOR COATING

(71) Applicant: SWIMC LLC, Cleveland, OH (US)

(72) Inventors: Weihua Kai, Foshan (CN); Gang Duan, Northbrook, IL (US); Xi Zhao, Foshan (CN); Shigang Fan, Foshan (CN)

(73) Assignee: Guangdong Huarun Paints Co., Ltd., Foshan (CN)

( * ) Notice: Subject to any disclaimer, the term of this patent is extended or adjusted under 35 U.S.C. 154(b) by 141 days.

(21) Appl. No.: 16/487,430

(22) PCT Filed: Feb. 20, 2018

(86) PCT No.: PCT/US2018/018713
§ 371 (c)(1),
(2) Date: Sep. 17, 2019

(87) PCT Pub. No.: WO2018/152498
PCT Pub. Date: Aug. 23, 2018

(65) Prior Publication Data
US 2020/0062909 A1    Feb. 27, 2020

(30) Foreign Application Priority Data
Feb. 20, 2017   (CN) .......................... 201710091733.4

(51) Int. Cl.
*C08G 83/00* (2006.01)
*C09D 187/00* (2006.01)

(52) U.S. Cl.
CPC ....... *C08G 83/001* (2013.01); *C09D 187/005* (2013.01)

(58) Field of Classification Search
None
See application file for complete search history.

(56) References Cited

U.S. PATENT DOCUMENTS

| | | | | |
|---|---|---|---|---|
| 3,540,869 A * | 11/1970 | Bauer | .................... | C08L 75/14 51/298 |
| 4,056,651 A | 11/1977 | Scola | | |
| 5,338,353 A * | 8/1994 | Uchino | .................. | C01B 33/26 106/426 |
| 5,491,182 A * | 2/1996 | Key | ...................... | C08F 212/08 523/206 |
| 6,214,899 B1 * | 4/2001 | Chawla | ................ | C09D 175/16 522/84 |
| 2011/0160364 A1 * | 6/2011 | Toyohara | ................ | C08L 67/04 524/117 |
| 2015/0160379 A1 * | 6/2015 | Shen | .................... | C03C 17/007 252/587 |

FOREIGN PATENT DOCUMENTS

| | | |
|---|---|---|
| CN | 1927938 A | 3/2007 |
| CN | 103756509 A | 4/2014 |
| EP | 0897375 A1 * | 2/1999 |
| EP | 0897375 A1 | 2/1999 |
| EP | 1999164 B1 | 10/2009 |

OTHER PUBLICATIONS

The first Office Action and search report dated Mar. 2, 2020 for Chinese Application No. 201710091733.4, 9 pages.
PCT International Search Report for PCT/US2018/018713, dated May 25, 2018, 9 pages.

* cited by examiner

*Primary Examiner* — Tae H Yoon
(74) *Attorney, Agent, or Firm* — Law Offices of Liaoteng Wang

(57) ABSTRACT

The present disclosure is directed to a process for the preparation of resin-inorganic fibers composite and the obtained resin-inorganic fibers composite for coating. The process comprises the step of providing inorganic fibers bearing one or more monomer functional groups reactive with a monomer component; and reacting resin-forming monomer components with the inorganic fibers bearing one or more monomer functional groups reactive with a monomer component, to obtain the resin-inorganic fibers composite, wherein the resin is selected from the group consisting of alkyd resin, polyester resin and a combination thereof. The present disclosure is also directed to a coating composition containing the composite and a coating formed from the coating composition.

21 Claims, No Drawings

PROCESS FOR THE PREPARATION OF RESIN-INORGANIC FIBERS COMPOSITE AND THE OBTAINED RESIN-INORGANIC FIBERS COMPOSITE FOR COATING

CROSS-REFERENCE TO RELATED APPLICATION

The present disclosure claims the benefit of an International Patent Application No. PCT/US2018/018713 filed on Feb. 20, 2018, which claims the benefit of Chinese Patent Application No. CN2017100917334 filed on 20 Feb. 2017, the entirety of which are hereby incorporated by reference.

TECHNICAL FIELD

The present disclosure relates to an inorganic fiber and its application. In particular, the present disclosure relates to a process for the preparation of resin-inorganic fibers composite and the obtained resin-inorganic fibers composite for coating. The present disclosure further relates to a coating composition containing the composite and the coating formed from the coating composition.

BACKGROUND

With the development of society, there is an increasing demand for coatings having various properties, especially for coatings having mechanical properties such as high hardness, excellent scratch resistance and abrasion resistance.

Currently, resin materials such as polyester (PE), alkyd, polyurethane (PU), epoxy, nitrocellulose and the like have been widely used for the preparation of coating compositions. However, these resin materials are difficult to provide coatings having desirable mechanical properties such as film hardness, scratch resistance and abrasion resistance due to their soft properties. Addition of various inorganic fibers, including glass fibers, is one of the commonly used solutions to improve the mechanical properties of coatings. However, mechanical properties such as film hardness, scratch resistance and abrasion resistance are difficult to be improved due to poor compatibility of the inorganic fibers with the resin materials and poor dispersion of the inorganic fibers in the resin materials. It has been proposed to use a coupling agent to modify the surface of inorganic fibers as a means for improving the compatibility between the inorganic fibers and the resin materials in the coating. However, coatings containing such inorganic fibers show only limited improvement in mechanical properties and cannot meet people's needs.

There is still a need in the coating industry for a further improved inorganic fiber systems which may further improve the hardness, excellent scratch resistance and abrasion resistance of the coating.

SUMMARY

In one aspect, the present disclosure provides a process for the preparation of a resin-inorganic fibers composite, comprising the steps of providing inorganic fibers bearing one or more monomer functional groups reactive with a monomer component; and reacting resin-forming monomer components with the inorganic fibers bearing one or more monomer functional groups reactive with a monomer component, to obtain the resin-inorganic fibers composite, wherein the resin is selected from the group consisting of alkyd resin, polyester resin and a combination thereof.

In some embodiments of the present disclosure, the step of providing inorganic fibers bearing one or more monomer functional groups reactive with monomer components comprises surface modifying the inorganic fibers with a coupling agent bearing one or more functional groups reactive with monomer components, preferably surface modifying the inorganic fibers with amino silane coupling agent.

In one embodiment of the present disclosure, the present composite is obtained by the steps of (a) surface modifying inorganic fibers with a coupling agent bearing one or more amine groups, thereby forming amino group-modified inorganic fibers; and then (b) in the presence of the amino group-modified inorganic fibers, reacting resin-forming monomer components so that the inorganic fibers are covalently bonded to the formed resin, thereby obtaining a resin-inorganic fibers composite.

In another aspect, the present disclosure provides a resin-inorganic fibers composite obtained by the present process. The obtained resin-inorganic fibers composite may be incorporated a water-borne coating composition, a solvent-borne coating composition or a powder coating composition.

In yet another aspect, the present disclosure further provides a coating composition that includes a resin-inorganic particles composite described herein. The coating composition may be a water-borne coating composition, a solvent-borne coating composition or a powder coating composition. Preferably, the coating composition is a solvent borne coating composition, for example, a PU or alkyd based solvent borne coating composition.

The present disclosure yet further provides a coating formed from the coating composition disclosed herein. In one embodiment of the present disclosure, the coating does not exhibit significant blushing when it is subjected to bending or folding one or more times. In one embodiment of the present disclosure, the coating has a pencil hardness of at least 2H, as measured according to ASTM D3363. In one embodiment of the present disclosure, the coating is capable of resisting scratch loading of greater than 250 g, as measured according to ASTM D2197. In one embodiment of the present disclosure, the coating has a film thickness retention ratio of 90% or more, when it is subjected to brushing with an aqueous medium containing sand particles having a particle size of 300-400 mesh by wet abrasion scrub tester REF 903 available from Sheen, England 500 cycles. In one preferred embodiment of the present disclosure, the coating has two or more, preferably three, more preferably four of above properties.

The inventors of the present disclosure have surprisingly found that the resin-inorganic fibers composite produced by the process of the present invention, when added as a component to a coating composition, can provide a coating having significantly improved hardness, scratch resistance and abrasion resistance. The inventors of the present disclosure have additionally found that the resin-inorganic fiber composite produced by the process of the present disclosure, when added as a component to a coating composition, may also produce a coating having significantly improved blushing resistance, which is unpredictable prior to the present disclosure.

The details of one or more embodiments of the disclosure are set forth in the following description. Other features, objects, and advantages of the disclosure will be apparent from the description and from the claims.

Selected Definitions

As used herein, "a", "an", "the", "at least one", and "one or more" are used interchangeably, unless indicated otherwise. Thus, for example, a coating composition that comprises "an" additive can be interpreted to mean that the coating composition includes "one or more" additives. Unless otherwise indicated herein, the use of the singular forms herein is also intended to include the plural forms.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not specifically mentioned in this disclosure, as long as such components or steps do not affect the basic and novel characteristics of the invention, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, ranges from any lower limit may be combined with any other lower limit to recite a range not explicitly recited, and in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used with inorganic fibers, the term "average fiber diameter" is one of parameters used to measure geometric dimensions of the inorganic fibers as determined by summing the diameters of the inorganic fibers to be tested and then averaging them. In some embodiments of the present disclosure, the average fiber diameter is in the range of 0.5 microns to 100 microns, preferably in the range of 1-50 microns, more preferably in the range of 2-25 microns, most preferably in the range of 5-15 microns.

When used with inorganic fibers, the term "number average aspect ratio" is one of parameters used to measure geometric dimensions of the inorganic fibers by summing the aspect ratios of the inorganic fibers to be tested and then dividing by the number of inorganic fibers to be tested. In one embodiment of the invention, the number average aspect ratio of fibers is in the range of 1.1:1 to 10:1, preferably in the range of 1.2:1 to 5:1, more preferably in the range of 1.6:1 to 1.7:1.

In the present disclosure, the phrase "the inorganic fibers having at least 50% by number of the fibers with an aspect ratio of 1.2:1 or greater" represents the geometric size distribution of inorganic fibers which is obtained by counting the inorganic fiber having a specific aspect ratio. In one embodiment of the present disclosure, at least 60%, at least 70%, or even at least 80% by number of the fibers in the inorganic fibers have an aspect ratio greater than or equal to 1.2:1.

The term "without significant blushing" when used with a coating refers that the coating does not exhibit any invisible change in color observed with naked eye when it is subjected to bending or folding one or more times. In one embodiment of the present disclosure, the coating does not exhibit any invisible change in color observed with naked eye when it is subjected to bending or folding two or more times.

In the present invention, a numerical range defined by an endpoint includes all any numerical value within that range, for example, a range of 1 to 5 encompasses numerical values of 1, 1.5, 2, 2.75, 3, 3.80, 4, 5, and the like. Also, the disclosed range of values includes all sub-ranges within that broader range, for example a range of 1 to 5 includes sub-ranges of 1 to 4, 1.5 to 4.5, 1 to 2, and the like.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

DETAILED DESCRIPTION

In one aspect, the present disclosure provides a process for the preparation of a resin-inorganic fibers composite, comprising the steps of (a) providing inorganic fibers bearing one or more monomer functional groups reactive with monomer components; and (b) reacting resin-forming monomer components with the inorganic fibers bearing one or more monomer functional groups reactive with monomer components, to obtain the resin-inorganic fibers composite, wherein the resin is selected from the group consisting of alkyd resin, polyester resin and a combination thereof.

In the step (a) of the present disclosure, inorganic fibers bearing one or more functional groups reactive with monomer components are commercially available or can be synthesized organically. Although it is presently preferred to provide inorganic fibers with one or more functional groups reactive with monomer components by surface modifying the inorganic fibers with a coupling agent having one or more functional groups reactive with monomer components, it is contemplated that other techniques may be used to provide inorganic fibers with one or more functional groups reactive with monomer components.

In this context, as an illustrative illustration, providing inorganic fibers with one or more functional groups reactive with monomer components is accomplished by the surface modification of the inorganic fibers with a coupling agent having one or more functional groups reactive with monomer components.

According to the present disclosure, an inorganic fiber is a material composed of a plurality of elongated inorganic mineral fibers having a certain aspect ratio which is structurally different from inorganic particles having a particulate or irregular shape like spherical or flake, such as glass powder. As a typical example, glass fibers, silica fibers, boron fibers, ceramic fibers, metal fibers or combination thereof may be given. Preferably, in one embodiment of the present disclosure, glass fibers are used as inorganic fibers. It is known that glass fibers have substantially the same mechanical properties as other fibers, such as polymer fibers and carbon fibers. Although not as strong or rigid as carbon fibers, glass fibers have the advantage of being less costly and less brittle when used in coatings. Therefore, the application of glass fibers in the coating industry is very promising.

Preferably, the inorganic fibers according to the present disclosure have a specific geometric size. In this context, average fiber diameter and number average aspect ratio are parameters for measuring geometric dimensions of the inorganic fibers. The average fiber diameter represents the number average of the diameters of the inorganic fibers as determined by dividing the sum of the diameters of all the inorganic fiber samples to be tested by the number of inorganic fiber samples to be tested. In some embodiments of the present disclosure, the inorganic fibers have an average fiber diameter of from 0.5 micrometers to 100 micrometers, preferably from 1 to 50 micrometers, more preferably from 2 to 25 micrometers, most preferably from 5 to 15 micrometers. The number average aspect ratio represents the number average of the aspect ratio of the inorganic fibers, which is determined by dividing the sum of the aspect ratios of all the inorganic fiber samples to be tested by the number of inorganic fibers in the inorganic fiber sample to be tested. In some embodiments of the present disclosure, the inorganic fibers have a number average aspect ratio in the range of 1.1:1 to 10:1, preferably in the range of 1.2:1 to 5:1, more preferably in the range of 1.5:1 to 3:1 and most preferably in the range of 1.6:1 to 1.7:1. Methods for measuring diameters and aspect ratios are known in the art. For example, the diameter and aspect ratio of inorganic fibers can be measured using a Leica DV M6 A microscope and analyzed using LAS software equipped with the Master module.

In general, the geometric size of inorganic fibers has some influence on its application. In coating applications, elongated inorganic fibers, such as inorganic fibers, having a length of 1 mm or greater are generally less preferred. In a preferred embodiment of the present disclosure, the inorganic fibers have an average fiber diameter of 5 to 15 microns and have a number average aspect ratio of 1.6:1 to 1.7:1.

More preferably, in the inorganic fibers according to the present disclosure, at least 50% by number of fibers have an aspect ratio of 1.2:1 or more. In some embodiments of the present disclosure, at least 60%, preferably at least 70%, or more preferably at least 80% by number of the fibers have an aspect ratio greater than or equal to 1.2:1. More preferably, at least 50%, preferably at least 60%, more preferably at least 70%, or even more preferably at least 80% by number of fibers in the inorganic fibers have an aspect ratio of in the range from 1.2:1 to 2.0:1.

The inventors of the present disclosure have surprisingly found that inorganic fibers (for example glass fibers) having the above-mentioned geometric size and/or size distribution are particularly suitable for improving hardness, scratch resistance and abrasion resistance of coatings and even are capable of improving blushing resistance of the coating.

According to the present invention, the coupling agent is a substance for surface modification of inorganic fibers which is capable of providing inorganic fibers with one or more functional groups reactive with monomer components, preferably with amino, hydroxyl, carboxyl, epoxy functional groups or combinations thereof, more preferably with amino groups. In an embodiment of the present invention, the coupling agent may include a silane coupling agent, a titanate coupling agent, an aluminate coupling agent, or a mixture thereof.

In an embodiment of the present disclosure, the coupling agent comprises a silane compound having the formula:

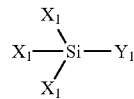

in which each $X_1$ is independently —Cl, —OCH$_3$, —OCH$_2$CH$_3$, —OC$_2$H$_4$OCH$_3$, —OSiMe$_3$, or —OCOCH$_3$; and $Y_1$ is an alkyl group substituted with —Cl, —NH$_2$, —SH, —OH, epoxy, —N$_3$, γ-methacryloxypropyl or isocyanate group, preferably an alkyl group with —NH$_2$. Preferably, the silane compound comprises γ-methacryloxypropyl trimethoxy silane, 3-aminopropyltriethoxysilane, γ-glycidoxypropyl trimethoxysilane or mixtures thereof, preferably 3-aminopropyltriethoxysilane.

In another embodiment of the present disclosure, the coupling agent comprises an oligomeric silane having the formula:

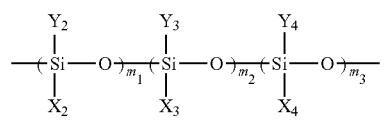

wherein each of $X_2$, $X_3$ and $X_4$ is independently —Cl, —OCH$_3$, —OCH$_2$CH$_3$, —OC$_2$H$_4$OCH$_3$, —OSiMe$_3$, —OCOCH$_3$, —H, —CH$_3$, —C$_2$H$_5$, and —OH with the proviso that at least one of $X_2$, $X_3$ and $X_4$ is not —H, —CH$_3$, –C$_2$H$_5$, or —OH; each of $Y_2$, $Y_3$ and $Y_4$ is independently an alkyl group substituted with —Cl, —NH$_2$, —SH, —OH, epoxy, —N$_3$, γ-methacryloxypropyl or an isocyanate group, preferably with —NH$_2$; and each of $m_1$, $m_2$ and $m_3$ independently is from 0 to 200, with the proviso that at least one of $m_1$, $m_2$ and $m_3$ is not 0. Preferably, each of $Y_2$, $Y_3$ and $Y_4$ is independently an alkyl group substituted with —NH$_2$.

In another embodiment of the present disclosure, the coupling agent comprises titanate. Titanate is known in the art, preferably having the formula:

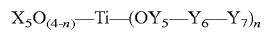

wherein $X_5$O is a hydrolyzable short chain alkoxy, preferably $C_{1-6}$ alkyloxy, such as methoxy and ethoxy;
$OY_5$ is a carboxyl, sulfonic, or phosphate group;
$Y_6$ is a long chain alkyl group, preferably $C_{12-24}$ alkyl, such as lauryl, cetyl or stearyl;
$Y_7$ is a hydroxyl, thiol, amino, or epoxy group; and
n is 2 or 3.

In another embodiment of the present disclosure, the coupling agent comprises an aluminate. As one example of aluminate, distearoyl isopropoxy aluminate, trimethyl aluminate, triisopropyl aluminate, tribenzyl aluminate or a mixture thereof may be used. Preferably, DL-411, DL-411AF, DL-411D, DL-411DF or ASA may be used as the aluminate.

In the surface modification of inorganic fibers with a coupling agent having one or more functional groups reactive with monomer components, it is preferred to use silane compounds as coupling agents such as KH550, KH540, such as those commercially available from Union-Carbon A-1100, KBM-903 of Shin-Etsu, Japan.

The amount of the coupling agent can be selected as appropriate within a suitable range. Preferably, the coupling agent with one or more functional groups reactive with monomer components is used in an amount of 0.2 to 10 wt %, preferably 0.5 to 8 wt %, more preferably 0.8 to 6 wt %, even more preferably 1-5 wt %, for example, 2 wt %, 3 wt %, 4 wt % or 5 wt %, relative to the weight of the inorganic fibers. Too little coupling agent is difficult to provide a sufficient amount of functional groups reactive with monomer components on the surface of the inorganic fibers; while too much coupling agent may disadvantageously reduce the mechanical properties of the inorganic fibers.

In the surface modification of inorganic fibers with a coupling agent with one or more functional groups reactive with monomer components, those skilled in the art may determine the conditions for surface modification of inorganic fibers with coupling agents, including use of solvents, reaction temperature, reaction time, and the like, based on the type of inorganic fibers and coupling agents.

In one particular embodiment of the present disclosure, the step of surface modifying inorganic fibers with a coupling agent is performed by mixing the inorganic fibers with the coupling agent in an alcohol solution at a pH of about 5.0, and then heating the mixture to a higher temperature (e.g., 120° C.) for a period of time (e.g., 3-6 hours) to yield an inorganic fiber with one or more functional groups reactive with monomer components. The resulting inorganic fibers can be used directly for further processing or can be separated from the reaction mixture and dried for use.

In the step (b) of the present invention, resin-forming monomer components are reacted with the inorganic fiber having one or more functional groups reactive with monomer components to obtain a resin-inorganic fiber composite, wherein the resin is selected from the group consisting of alkyd resins, polyesters, or combinations thereof. Preferably, the inorganic fibers with one or more functional groups reactive with monomer components are present in an amount of 0.5 to 99.5 wt %, preferably 2 wt % to 90 wt %, more Preferably 3 wt % to 80 wt %, even more preferably 5 wt % to 70 wt %, relative to the total weight of the resin forming monomer components.

According to the present invention, the resin forming monomer components may be used to form an alkyd resin, a polyester, or a combination thereof, comprising: (a) 10-70% by weight of a polyol; (b) 10-70% by weight of a polyacid (C) 0 to 80 wt % of a fatty acid, a fatty acid ester or a naturally occurring oil; and (d) 0 to 15 wt % of a monofunctional acid, wherein the wt % is relative to the total weight of components of (a), (b), (c), and (d); and wherein the molar equivalent ratio of the polyols to the sum of the polyacid, the fatty acid, fatty acid ester or occurring oil and the monofunctional acid, i.e. the molar equivalent ratio of component (a) to the sum of components (b) to (d), is in the range of 1:5 to 5:1.

In the resin forming monomer components, the polyol may comprise a diol, a triol, a tetraol, a polymer having two or more hydroxyl functional groups, and a combination thereof. In some embodiments of the present disclosure, the polyol comprises ethylene glycol, diethylene glycol, triethylene glycol, polyethylene glycol, propylene glycol, dipropylene glycol, polypropylene glycol, pentylene glycol, pentaerythritol, trimethylol propane, trimethylol ethane, glycerol, dipentaerythritol, polyesters having one or more (preferably two or more) hydroxyl groups, polyacrylates having one or more (preferably two or more) hydroxyl groups, polyurethanes having one or more (preferably two or more) hydroxyl groups, epoxy polymers having one or more (preferably two or more) hydroxyl groups and other polyols known to one of ordinary skill in the art for use in the preparation of the resin. The polyol may be used alone or in combination. The amount of the above polyol may be adjusted within a suitable range, preferably in the range of 20 to 60 wt %, more preferably in the range of 30 to 50 wt %.

Among the resin forming monomer components, the polyacid comprises a dibasic acid or its anhydride such as phthalic acid and its anhydride, isophthalic acid, terephthalic acid, succinic acid, adipic acid, suberic acid, azelaic acid, sebacic acid, tetrachlorophthalic acid, tetrabromophthalic acid, maleic acid, fumaric acid, mesaconic acid, citraconic acid, dichloromaleic acid; a tribasic acid or its anhydride such as trimellitic acid; a tetrabasic acid or its anhydride such as pyromellitic anhydride; and combinations thereof, as well as other polybasic acids or anhydrides known to one of ordinary skill in the art for making the resins. The polyacid may be used alone or in combination. The amount of the above polyacid may be adjusted within a suitable range, preferably in the range of 20 to 60% by weight, more preferably in the range of 30 to 50% by weight.

Among the resin forming monomer components, the fatty acid, fatty acid ester or naturally occurring, partially saponified oil are optionally present. In embodiments where the resin is an alkyd resin, the monomer component comprises a fatty acid, a fatty acid ester, or a naturally occurring, partially saponified oil, which may be any fatty acid, fat acid esters or naturally occurring, partially saponified oils known in the art for forming an alkyd resin. In a preferred embodiment, the fatty acid, fatty acid ester and naturally occurring, partially saponified oil are selected from the following formulas (1), (2), (3):

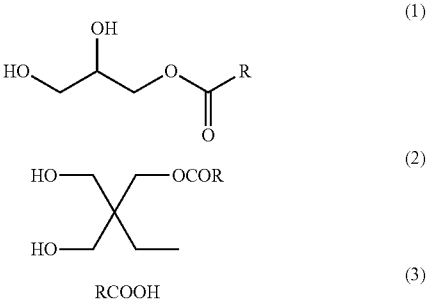

in which, R is a saturated or unsaturated $C_8$-$C_{22}$ alkyl group.

Representative fatty acid includes oleic acid, dehydrated castor fatty acid, flax fatty acid, castor fatty acid, soya fatty acid, and the like, and combinations thereof. Representative fatty oil includes vegetable oils such as carnauba oil, castor oil, dehydrated castor oil, coconut oil, corn oil, cottonseed oil, groundnut oil, linseed oil, peanut oil, ricinene oil, soybean oil, sunflower oil, tall oil, tung oil, walnut oil, wood oil and the like; animal fats such as fish oil, lard, chicken fat, tallow, and the like.

The fatty acid, fatty acid ester or naturally occurring, partially saponified oil may be used alone or in combination. The amount of the above fatty acid, fatty acid ester or naturally occurring, partially saponified oil may be adjusted within a suitable range, preferably in the range of 10-50 wt %, more preferably in the range of 10-40 wt %.

Monofunctional acids are optionally present in the monomer components that make up the above resins. Representative monofunctional acids are selected from the group consisting of benzoic acid, acetic acid, propionic acid, t-butyl benzoic acid, or combinations thereof. Monofunctional acids may be used alone or in combination. The amount of the above monofunctional acid may be adjusted within a suitable range, preferably in the range of 0 to 10 wt %, more preferably in the range of 0.1 to 5 wt %.

Those skilled in the art can determine appropriate conditions for the synthesis of the resin inorganic fiber composite, including the use of a solvent, the kind of a catalyst, the reaction temperature, the reaction time, and the like, depending on the type of the functional group reactive with the monomer components carried on the inorganic fiber. As an example, in some embodiments, step (b) is performed at 160-220° C. for 10-20 hours (e.g., 15 hours) under an appropriate catalyst optionally in the presence of a solvent. Any solvent well known to those skilled in the art can be used, for example, xylene, toluene, butanol, butyl acetate, propylene glycol monomethyl ether acetate or a combination thereof, but not limited thereto. As an example of a catalyst, triethylamine can be used.

According to the present disclosure, in a specific embodiment, a process for preparing a resin-inorganic fiber composite includes the steps of:

(A) surface-modifying inorganic fibers with a coupling agent baring one or more amino groups, thereby forming amino group-modified inorganic fibers; and then (B) in the presence of the amino group-modified inorganic fibers, reacting resin forming monomer components so that the inorganic fibers are covalently bonded to the formed resin, thereby forming the resin-inorganic fiber composite.

The present inventors have surprisingly found that the resin-inorganic fiber composite produced by the process of the present disclosure, when added as a component to a coating composition, can produce a coating with significantly improved hardness, scratch resistance and abrasion resistance. In contrast, the coating obtained by adding an unmodified or surface-modified inorganic fiber as a component to a coating composition has a very limited improvement in hardness, scratch resistance and abrasion resistance, which still cannot meet the needs of people. Without being bound by any theory, applicants believe that the compatibility between inorganic fibers and resin may be significantly improved by reacting resin forming monomer components with the functional groups of the inorganic fibers which are reactive with the monomer components, thereby covalently bonding the inorganic fibers to resin. Addition of this resin inorganic fiber composite to the coating composition further enhances the hardness, scratch resistance and abrasion resistance of the coating formed from the coating composition.

The inventors of the present disclosure have additionally found that the resin-inorganic fiber composite produced by the process of the present disclosure, when added as a component to a coating composition, can also produce a coating having significantly improved blushing resistance, which is unpredictable prior to the present invention.

Therefore, another aspect of the present invention provides a resin inorganic fiber composite obtained by the process of the present disclosure. Preferably, the thus obtained resin-inorganic fiber composite may have a solids content of about 40-90%, preferably a solids content of 50%-85%, more preferably a solids content of 60-80%. This resin inorganic fiber composite can be used without further treatment or can be isolated for other steps.

Coating Composition and Coating Formed Therefrom

In a further aspect, the present invention also provides a coating composition comprising the resin inorganic fibers composite according to the present disclosure. The present resin inorganic fibers composite may be used as an additive or as a film-forming resin component to be added to the coating composition. The present coating composition may further comprise an additional resin component, a crosslinker, a solvent and optionally an additional additive. The coating composition of the present invention may be a solvent-type coating composition or a powder coating composition, preferably a solvent-borne coating composition.

In one embodiment of the present disclosure, the resin-inorganic fiber composite is incorporated into the coating composition as an additive in an amount of about 1 to 20% by weight, preferably 1 to 15% by weight, more preferably 3 to 12% by weight with respect to the total amount of the coating composition. In another embodiment of the present disclosure, the resin-inorganic fiber composite is incorporated into the coating composition as a film-forming resin in an amount of about 60 to 99% by weight, preferably 70 to 95% by weight, more preferably 75 to 90% by weight with respect to the total amount of the coating composition.

Preferably, the resin inorganic fibers composite is incorporated into the coating composition as a film-forming resin to constitute the main body of the coating composition. The present resin inorganic fibers composite acts as a binder to provide adhesion of the coating to the substrate and to keep various components of the coating composition (such as fillers, if present) together and to impart a certain coating cohesive strength.

Optionally, the present coating composition further comprises other film-forming resin components commonly used in the field of coating including, but not limited to, an alkyd resin, a urethane resin, a phenolic resin, a polyester resin, an acrylate resin, an epoxy resin, a nitrocellulose (NC) and the like. The amount of the other resin components in the coating composition may vary within a wide range, which may be reasonably determined by those skilled in the art. In the present coating composition, the additional resin components are present in an amount of 0 to 90% by weight, preferably 40-90% by weight, more preferably 50-80% by weight, even more preferably 60-80% by weight relative to the total weight of the coating composition.

Optionally, the present coating composition may additionally contain a crosslinking agent so that the resin component of the coating composition reacts with a crosslinking agent such as an isocyanate-functional group-containing component to achieve crosslinking of the polymer chains, whereby a coating with a three-dimensional network structure is formed.

In one embodiment of the present disclosure, the present coating composition comprises a cross-linking agent containing an isocyanate functional group (e.g., SPAICI Hardener ES) in which the mole equivalent ratio of the hydroxy functional groups of the resin component to the isocyanate functional groups of the polyisocyanate is in the range of 0.8:1 to 1.2:1, preferably in the range of 0.9:1 to 1.1:1.

Solvent, as used herein, refers to a material that primarily acts as a diluent in the coating composition, which is chemically inert. In some embodiments of the present disclosure, the solvents include aromatic hydrocarbons and esters known to one of ordinary skill in the art. Representative examples may include benzene, toluene, xylene, chlorobenzene, methyl acetate, ethyl acetate, butyl acetate, isoamyl acetate, ethylene carbonate, propylene glycol monomethyl ether acetate (PM acetate), C8-C13 aromatic hydrocarbons (such as Aromatic 100, Aromatic 150 and Aromatic 200 commercially available from Exxon), and mixtures thereof.

The amount of solvent in the coating composition of the present invention can vary widely which may be reasonably determined by one skilled in the art. In the coating composition of the present disclosure, the solvent is present in an amount of about 1 to 30% by weight, preferably 5 to 25% by weight, more preferably 10 to 20% by weight with respect to the total amount of the coating composition.

The present coating composition may optionally include additional additives for a coating composition which do not adversely affect the coating composition or a resultant coating obtained therefrom. Suitable additives include, for example, those that improve the process ability or manufacturability of the composition, enhance composition aesthetics, or improve a particular functional property or characteristic of the coating composition or the cured composition resulting therefrom, such as adhesion to a substrate. Additives that may be included are, for example, fillers, anti-skinning agents, siccatives, emulsifiers, pigments, fillers, anti-migration aids, antibacterial agents, chain extenders, lubricants, wetting agents, biocides, plasticizers, defoamers, colorants, waxes, antioxidants, anticorrosion agents, flow control agents, thixotropic agents, dispersants, adhesion promoters, UV stabilizers, thickeners, a defoaming agent, a pH adjusting agent, a leveling agent, or a combination thereof. Each optional ingredient is present in an amount sufficient to achieve its intended purpose, but preferably such an amount does not adversely affect the coating composition or the cured coating obtained therefrom. In a preferred embodiment of the present disclosure, suitable additional additives include leveling agents, defoaming agents, or any combination thereof.

In a preferred embodiment, the coating composition of the present disclosure comprises about 0 to about 10% by weight, preferably about 0.1 to about 0.5% by weight, of additional additives relative to the total weight of the coating composition. Specifically, the amount of additional additives in the coating composition is from about 0.2%, 0.3%, about 0.4%, about 0.6%, about 0.7%, about 0.8 wt. % or about 0.9 wt % to about 9.0 wt. %, about 7.0 wt. %, about 6.0 wt. %, about 5.0 wt. %, about 4.0 wt. %, about 2.0 wt. %, or about 1.0 wt. % relative to the total weight of the coating composition.

In the present disclosure, the coating composition can be prepared by any suitable method known to one of ordinary skill in the art. For example, the coating composition can be made by adding all of the components to the container and then stirring the resulting mixture until homogeneous. Alternatively, the coating composition can be made by first mixing some of the components and then adding the rest of the other components to form a homogeneous mixture.

According to the present disclosure, the coating composition can be applied by customary coating methods known to a person skilled in the art. The coating methods include dip coating, spin coating, spray coating, curtain coating, brush coating, roll coating, and other coating methods known in the art. In the present invention, the coating is applied in a wet-on-dry process. Typically, the solvent in the coating composition is removed by natural or accelerated (heat) drying to form a coating.

Thus, the present disclosure also provides a coating formed from a coating composition comprising the resin inorganic fibers composite as described herein. The coatings of the present disclosure may exhibit one or more of the following properties: no blushing when subjected to a bending or folding process; a pencil hardness of at least 2H; a scratch resistance of 250 g or more, more preferably 300 g or more; a film thickness retention of 90% or higher after 500 cycles of wet abrasion.

In some embodiments, the coating of the present disclosure does not exhibit significant blushing when subjected to one or more bends or folds.

In some embodiments, the coating of the present disclosure has a pencil hardness of at least 2H when measured according to ASTM D3363.

In some embodiments, the coating of the present disclosure is capable of withstanding a scratch load of 250 g or higher when measured in accordance with ASTM D2197.

In some embodiments, the coating of the present disclosure has a film thickness retention of 90% or more, such as 91%, 92%, 93% or more, for example, when subjected to 500 cycles of a wet abrasion tester REF 903 available from Sheen, England with an aqueous medium comprising grit particles having a particle size of 300-400 mesh.

The invention also provides a coated article comprising a substrate; and a coating according to the invention coated on the substrate. The substrate can be any coatable material. Those skilled in the art can select and determine a suitable material as a substrate according to actual needs. In some preferred embodiments, the article according to the invention may be a wood substrate, a metal substrate, a cement product, a ceramic, a plastic substrate or a building wall or the like.

Testing Method

Inorganic Fiber Diameter and Aspect Ratio

Put 1-2 g of glass fibers in a glass beaker and pour 25 g of pure water; then, sonicate to disperse the glass fibers in the water; drop the glass fiber suspension onto the glass slide, cool it with cool air from dryer; place the slide under a digital microscope (Leica DVM6 A) and take a picture of the fiberglass; and make analysis and statistics in the LAS software equipped with the Master module under the Grain Size function.

Gloss

This test was performed according to ASTM D523 to assess the gloss of the coating.

Adhesion

Adhesion test was performed to assess whether the coating adheres to the coated substrate. The adhesion test was performed according to ASTM D 3359 with the level of 0-5B.

Pencil Hardness

This test was performed to measures the hardness of a cured coating. Pencil hardness was assessed using ASTM D3363. The data is reported in the form of the last successful pencil prior to film rupture. Thus, for example, if a coating does not rupture when tested with a 2H pencil, but ruptures when tested with a 3H pencil, the coating is reported to have a pencil hardness of 2H.

Dry Film Transparency

This test was performed to assess the optical property of a cured coating. The formulated samples were drawn down on clear PVC panel in a wet thickness of about 100 microns and then dried enough for 3 days. After that, the film transparency was checked by reflectivity meter, for example with RT-6000 available from US Oakland.

Anti-Scratch Performance

This test was performed to assess scratch resistance of a cured coating under a load of a certain weight in g. The formulated samples were drawn down on metal panels in a wet thickness of about 100 microns and then dried enough for 3 days followed by checking the dry film thickness. After that the anti-scratch resistance was carried out by anti-scratch machine according to ASTM D2197. The results were recorded as to the weight of test-to-fail.

Abrasion Resistance

This test was performed to assess abrasion resistance of a cured coating, which was measured by film retention ratio in %. The formulated samples were drawn down on black PVC side by side in a wet thickness of about 100 microns and then dried enough for 3 days followed by checking the dry film thickness. After that the abrasion resistance was carried out by abrasion machine. After brushing 500 times, the test stopped followed by confirming the film retention ratio in %.

Blushing Resistance

This test was performed to assess bending resistance of a cured coating, which was observed by naked eye visually. The formulated clear samples were applied on black primer in a thickness of about 20-30 microns and dried to obtain a dry film thickness of 50-60 microns. Before testing, the film was air dried for 7 days. After the coatings were dried completely, the samples were bended by folding themselves and observed whether the bended portion turned pale.

EXAMPLES

The present disclosure is further described in the following examples that are intended as illustrations only. It is to be understood that the particular examples, materials, amounts, and procedures are to be interpreted broadly in accordance with the scope and spirit of the present inventions as set forth herein.

Unless otherwise noted, all parts, percentages, and ratios reported in the following examples are on a weight basis. Unless otherwise specified, all chemicals are used are commercially available.

Example 1—An Alkyd Glass Fiber Composite

Surface Modification of Glass Fibers

The surface modification of glass fibers was carried out as follows. KH550 was used as a coupling agent and XGFT 91000 available from Shenzhen XianGu High-Tech. Co. LTD, China was used as glass fiber. To a reactor, glass fiber was added followed by xylene. After that, KH550 and triethylamine as catalyst were added to the reaction flask subsequently. The reaction mixture was heated to 120° C. for 3-6 hours, and then resulting product was filtered by removing and dried for storage. The surface modified glass fiber was obtained using the ingredients of Table 1 below.

TABLE 1

| Raw Materials | Description | AMOUNT (in grams) |
| --- | --- | --- |
| XGFT 91000 | Glass fiber having an average fiber diameter of 12.5 μm and a number average aspect ratio of 1.6-1.7 | 100 |
| Xylene | Solvent | 150 |
| KH550 | Amino functional silane | 1-5 |
| Triethylamine | catalyst | 0.01-0.05 |

An Alkyd Resin Glass Fibers Composite

The alkyd resin Glass fibers composite was prepared using the raw materials of table 2 below. The obtained surface modified glass fibers, oleic acid, pentaerythritol, neopentyl glycol, phthalic anhydride were added in proper order with good agitation and reacted with each other. The resultant finishes had a solids content of about 70%, with 5% or 10% glass fiber relative to the solid content.

TABLE 2

| Raw Materials | Composite Sample 1 | Composite Sample 2 |
| --- | --- | --- |
| modified glass fiber (wt %) | 5.00 | 10.00 |
| Oleic acid (wt %) | 29.545 | 27.99 |
| Pentaerythritol (wt %) | 18.05 | 17.1 |

TABLE 2-continued

| Raw Materials | Composite Sample 1 | Composite Sample 2 |
| --- | --- | --- |
| Neopentyl glycol (wt %) | 13.395 | 12.69 |
| Phthalic anhydride (wt %) | 34.01 | 32.22 |
| Total | 100 | 100 |

Example 2—a Solvent-Borne Paint Containing Above Alkyd Resin Glass Fibers Composite A clear solvent-borne paint was formulated using the ingredients of table 3 below. As a control, comparative sample does not contain the alkyd resin glass fibers composite in which an alkyd resin for example SAPICI REXIN R572 was used as a film-forming resin. In each paint, HDI or TDI was used as a hardener and the ratio of hydroxyl group to isocyanate group is 1:1.1 was used. The formulations for the clear paint and the coating performance from the formulations were shown on table 3 below.

TABLE 3

| Items | Com. Ex | Sample 1 | Sample 2 |
| --- | --- | --- | --- |
| Film-forming resin (wt %) | 80 | — | — |
| Composite Sample 1 (wt %) | — | 80 | — |
| Composite Sample 2(wt %) | — | — | 80 |
| Tego 450(wt %) | 1 | 1 | 1 |
| BYK 141(wt %) | 0.2 | 0.2 | 0.2 |
| Butyl Acetate (wt %) | 12 | 12 | 12 |
| Xylene (wt %) | 6.8 | 6.8 | 6.8 |
| Pencil hardness | H | 2H | 2H |
| Adhesion | 4B | 5B | 5B |
| Gloss | 99 | 94.2 | 82 |
| Dry time (min) | 3 | 3 | 3 |
| Dry film transparency | 94.5% | 94.5% | 93.9% |
| Abrasion resistance | 88.9% | 93.7% | 92.1% |
| Anti-scratch (g, pass) | 200 | 300 | 300 |

From above results, it was shown that the glass fiber composite of the present disclosure exhibited better performances in terms of coating's hardness, anti-scratch property and abrasion resistance. A significant increase in hardness of the coating was observed, which reached a level of 2H. The scratch resistance of the coating reached 300 g, whereas the coating without the resin glass fibers composite obtained only 200 g. Wear resistance is also good. In contrast, the comparative examples without the resin glass fibers composite of the present invention showed significantly lower pencil hardness, abrasion resistance and scratch resistance.

While the invention has been described with respect to a number of embodiments and examples, those skilled in the art, having benefit of this disclosure, will appreciate that other embodiments can be devised which do not depart from the scope and spirit of the invention as disclosed herein.

What is claimed:

1. A coating composition, comprising a composite made by a process comprising the steps of
providing inorganic fibers bearing one or more monomer functional groups reactive with a monomer component; and
reacting resin-forming monomer component with the inorganic fibers bearing one or more monomer functional groups reactive with a monomer component, to obtain the resin-inorganic fibers composite, wherein the resin is selected from the group consisting of alkyd resin, polyester resin and a combination thereof, and the coating composition is solvent borne.

2. A coating formed from the coating composition according to claim 1, which does not exhibit significant blushing when it is subjected to bending or folding one or more times.

3. A coating formed from the coating composition according to claim 1, which has a pencil hardness of at least 2H, as measured according to ASTM D3363.

4. A coating formed from the coating composition according to claim 1, which is capable of resisting scratch loading of greater than 250 g, as measured according to ASTM D2197.

5. A coating formed from the coating composition according to claim 1, which has a film thickness retention ratio of 90% or more, when it is subjected to brushing with an aqueous medium containing sand particles having a particle size of 300-400 mesh by wet abrasion scrub tester REF 903 available from Sheen, England 500 cycles.

6. The coating composition according to claim 1, wherein the step of providing inorganic fibers bearing one or more monomer functional groups reactive with a monomer component comprises surface modifying the inorganic fibers with a coupling agent bearing one or more functional groups reactive with a monomer component.

7. The coating composition according to claim 6, wherein the coupling agent comprises a silane coupling agent, a titanate coupling agent, an aluminate coupling or a mixture thereof.

8. The coating composition according to claim 6, wherein the coupling agent comprises silane compound having the formula:

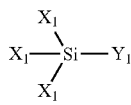

in which
each $X_1$ is independently —Cl, —OCH$_3$, —OCH$_2$CH$_3$, —OC$_2$H$_4$OCH$_3$, —OSiMe$_3$, or —OCOCH$_3$; and
$Y_1$ is an alkyl group substituted with —Cl, —NH$_2$, —SH, —OH, epoxy, —N$_3$, γ-methacryloxypropyl or isocyanate group.

9. The coating composition according to claim 6, wherein the coupling agent comprises a silane compound comprising γ-methacryloxypropyl trimethoxy silane, 3-aminopropyltriethoxysilane, γ-glycidoxypropyl trimethoxysilane or mixtures thereof.

10. The coating composition according to claim 6, wherein the coupling agent comprises a silane having the formula:

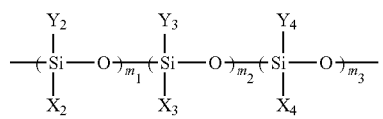

wherein each of $X_2$, $X_3$ and $X_4$ is independently —Cl, —OCH$_3$, —OCH$_2$CH$_3$, —OC$_2$H$_4$OCH$_3$, —OSiMe$_3$, —OCOCH$_3$, —H, —CH$_3$, —C$_2$H$_5$, and —OH with the proviso that at least one of $X_2$, $X_3$ and $X_4$ is not —H, —CH$_3$, —C$_2$H$_5$, or —OH;

each of $Y_2$, $Y_3$ and $Y_4$ is independently an alkyl group substituted with —Cl, —NH$_2$, —SH, —OH, epoxy, —N$_3$, γ-methacryloxypropyl or an isocyanate group; and each of $m_1$, $m_2$ and $m_3$ independently is from 0 to 200, with the proviso that at least one of $m_1$, $m_2$ and $m_3$ is not 0.

11. The coating composition according to claim 7, wherein the coupling agent comprises a titanate having the formula:
$X_5O_{(4-n)}$—Ti—$(OY_5$—$Y_6$—$Y_7)_n$;
wherein $X_5O$ is a hydrolyzable short chain alkoxy;
$OY_5$ is a carboxyl, sulfonic, or phosphate group;
$Y_6$ is a long chain alkyl group;
$Y_7$ is a hydroxyl, thiol, amino, or epoxy group; and
n is 2 or 3.

12. The coating composition according to claim 6, wherein the coupling agent comprises an aluminate comprising distearoyl isopropoxy aluminate, trimethyl aluminate, triisopropyl aluminate, tribenzyl aluminate or a mixture thereof.

13. The coating composition according to claim 6, wherein the inorganic fibers have an average fiber diameter of from 0.5 micron to 100 microns.

14. The coating composition according to claim 6, wherein the inorganic fibers have an average fiber diameter of from 1 micron to 50 microns.

15. The coating composition according to claim 6, wherein the inorganic fibers have a number average aspect ratio of from 1.1:1 to 10:1.

16. The coating composition according to claim 6, wherein the inorganic fibers have at least 50% by number of the fibers with an aspect ratio of 1.2:1 or greater.

17. The coating composition according to claim 6, wherein the inorganic fibers comprises glass fibers, silica fibers, boron fibers, ceramic fibers, metal fibers or combination thereof.

18. The coating composition according to claim 1, wherein the inorganic fibers bearing one or more functional groups reactive with a monomer component are used in an amount of 0.5 wt % to 99.5 wt %, relative to the total weight of resin-forming monomer component.

19. The coating composition according to claim 6, wherein the coupling agent bearing one or more functional groups reactive with a monomer component is used in an amount of 0.2 to 10 wt %, relative to the weight of the inorganic fibers.

20. The coating composition according to claim 1, wherein the resin-forming monomer component comprises (a) 20 to 60 wt % of polyols; (b) 20 to 60 wt % of polyacids; (c) 0 to 50 wt % of fatty acids, fatty acid esters or occurring oils; and (d) 0 to 15 wt % of monofunctional acids,
wherein the wt % is relative to the total weight of components of (a), (b), (c), and (d); and wherein the molar equivalent ratio of the polyols to the sum of the polyacids, the fatty acids, fatty acid esters or occurring oils and the monofunctional acids is 1:2 to 2:1.

21. The coating composition according to claim 1, wherein the process comprises the steps of
(a) surface modifying the inorganic fibers with a coupling agent bearing one or more amine groups, thereby forming amino group-modified inorganic fibers; and then
(b) in the presence of the amino group-modified inorganic fibers, reacting resin-forming monomer component so that the inorganic fibers are covalently bonded to the formed resin, thereby obtaining a resin-inorganic fibers composite.

\* \* \* \* \*